United States Patent
Alhseinat et al.

(10) Patent No.: US 11,904,327 B2
(45) Date of Patent: Feb. 20, 2024

(54) TREATING SALINE WATER AND OTHER SOLVENTS WITH MAGNETIC AND ELECTRIC FIELDS

(71) Applicant: Khalifa University of Science and Technology, Abu Dhabi (AE)

(72) Inventors: Emad Alhseinat, Abu Dhabi (AE); Fawzi Banat, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 645 days.

(21) Appl. No.: 17/059,082

(22) PCT Filed: May 29, 2019

(86) PCT No.: PCT/IB2019/054453
§ 371 (c)(1),
(2) Date: Nov. 25, 2020

(87) PCT Pub. No.: WO2019/229674
PCT Pub. Date: Dec. 5, 2019

(65) Prior Publication Data
US 2021/0230026 A1    Jul. 29, 2021

Related U.S. Application Data

(60) Provisional application No. 62/677,960, filed on May 30, 2018.

(51) Int. Cl.
*B03C 1/033*    (2006.01)
*B03C 5/02*     (2006.01)
(Continued)

(52) U.S. Cl.
CPC .......... *B03C 1/0332* (2013.01); *B03C 1/023* (2013.01); *B03C 1/0335* (2013.01); *B03C 5/02* (2013.01);
(Continued)

(58) Field of Classification Search
CPC ................ C02F 1/4604; C02F 1/48
See application file for complete search history.

(56) References Cited

U.S. PATENT DOCUMENTS 5,238,577 A * 8/1993 Newsom ................. B03C 1/288
                                                210/695
5,304,302 A * 4/1994 Bossert ................... C02F 1/484
                                                210/695
(Continued)

FOREIGN PATENT DOCUMENTS

CN    107098536 A    8/2017
EP    1880980 A1     1/2008
(Continued)

OTHER PUBLICATIONS

Machine translation of CN107098536 of Liu et al. (Year: 2017).*
(Continued)

*Primary Examiner* — Brian W Cohen
(74) *Attorney, Agent, or Firm* — Billion & Armitage

(57) ABSTRACT

A liquid desalination system is disclosed. The liquid desalination system includes a feed line having an inlet to receive liquid and an outlet to discharge the liquid. The liquid desalination system includes a magnet coupled to the feed line, the magnet to generate an oscillating magnetic field within the feed line and in opposition to the feed water flow. The removal of targeted ions can be achieved by manipulating the frequency and rate of the generated electromagnetic waves. The generated electromagnetic waves can be tuned to weaken the hydration bonds of that specific ion and facilitate its removal. The liquid desalination system generates an electric field across the feed line to enable the liquid to flow through the electric field. The electric field may attract sodium ions to a positive electrode and may attract chloride ions to a negative electrode, to desalinate the liquid in the feed line.

18 Claims, 7 Drawing Sheets

(51) Int. Cl.
*C02F 1/48* (2023.01)
*B03C 1/023* (2006.01)
*C02F 1/46* (2023.01)
*C02F 103/08* (2006.01)

(52) U.S. Cl.
CPC ............ *C02F 1/4606* (2013.01); *C02F 1/485* (2013.01); *C02F 2103/08* (2013.01); *C02F 2201/483* (2013.01)

(56) References Cited

U.S. PATENT DOCUMENTS

| | | | |
|---|---|---|---|
| 10,610,589 B2 * | 4/2020 | Dutu | A61K 41/10 |
| 2018/0178184 A1 * | 6/2018 | Holland | B03C 1/28 |

FOREIGN PATENT DOCUMENTS

| | | | |
|---|---|---|---|
| KR | 101340450 B1 | | 12/2013 |
| SU | 1416448 A | * | 8/1988 |
| WO | 2006039873 A1 | | 4/2006 |

OTHER PUBLICATIONS

Machine translation of SU1416448A (Year: 1988).*
"Extended European Search Report Received dated Feb. 9, 2022", 11 pages.
Search Report and Written Opinion for PCT/IB2019/054453 dated Sep. 16, 2019.

* cited by examiner

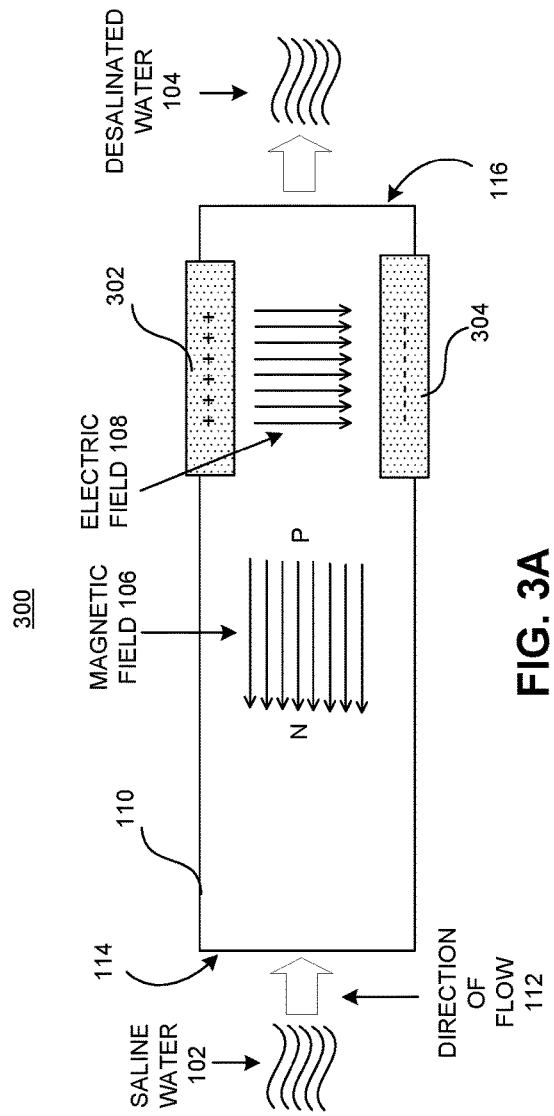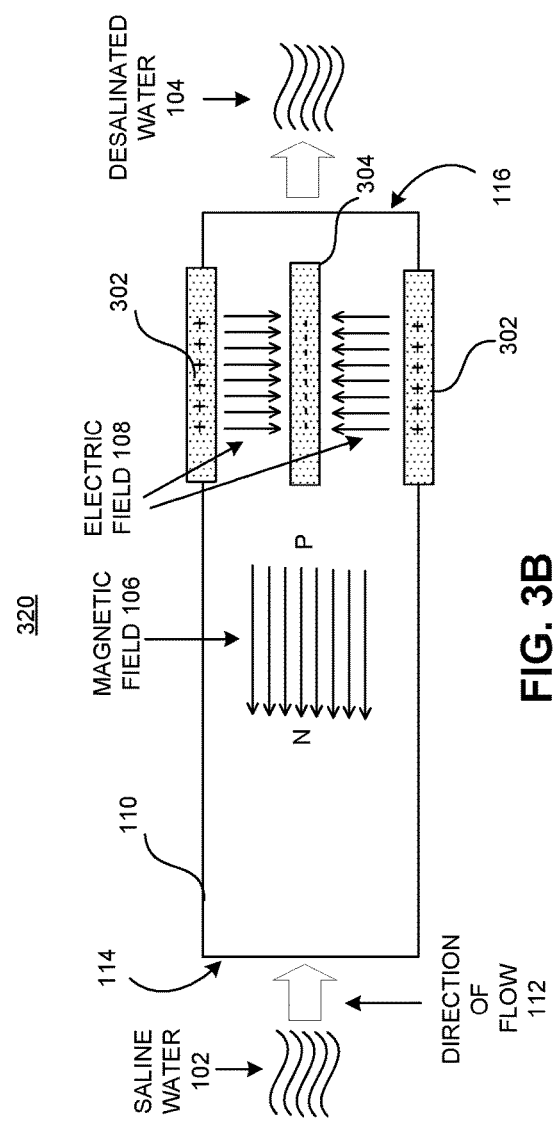
FIG. 3A
FIG. 3B

400

```
┌─────────────────────────────────────────────────────────────┐
│ DIRECT LIQUID THROUGH AN INLET OF A FEEDLINE TO CAUSE THE   │
│ LIQUID TO PASS THROUGH THE FEEDLINE AND TO EXIT AN OUTLET   │
│                     OF THE FEEDLINE                         │
│                           402                               │
└─────────────────────────────────────────────────────────────┘
                              │
                              ▼
┌─────────────────────────────────────────────────────────────┐
│  GENERATE A MAGNETIC FIELD WITHIN AT LEAST PART OF THE      │
│  FEEDLINE, WHEREIN THE MAGNETIC FIELD IS PARALLEL TO A      │
│              DIRECTION OF FLOW OF THE LIQUID                │
│                           404                               │
└─────────────────────────────────────────────────────────────┘
                              │
                              ▼
┌─────────────────────────────────────────────────────────────┐
│ GENERATE AN ELECTRIC FIELD ACROSS THE FEEDLINE, WHEREIN     │
│ THE ELECTRIC FIELD IS PERPENDICULAR TO THE DIRECTION OF     │
│                     FLOW OF THE LIQUID                      │
│                           406                               │
└─────────────────────────────────────────────────────────────┘
```

FIG. 4

TREATING SALINE WATER AND OTHER SOLVENTS WITH MAGNETIC AND ELECTRIC FIELDS

TECHNICAL FIELD

The present disclosure relates generally to using magnetic fields and electric fields to desalinate water and other solvents.

BACKGROUND INFORMATION

Fresh water makes up less than 3% of the Earth's water supply, while salt water (saline) constitutes the other 97%. Since it makes up most of the water on our planet, salt water represents a relatively untapped resource that may be used to increase food production (crops) and improve sanitary and other living conditions. Some solutions for desalinating water exist, but the solutions require large amounts of power, are relatively slow (e.g., pass water through multiple membranes), and are generally inaccessible to those with limited finances. A low power, low cost, and rapid desalination system could solve one of the world's major problems—limited useful water supplies.

BRIEF DESCRIPTION OF THE DRAWINGS

These and other features and advantages will be better understood by reading the following detailed description, taken together with the drawings wherein:

FIGS. 3A and 3B show examples of electrode configurations for a liquid desalination system, in accordance with embodiments of the present disclosure.

FIG. 4 shows an example of a method of desalinating a liquid, in accordance with embodiments of the present disclosure.

DETAILED DESCRIPTION

Embodiments of the present disclosure include a liquid desalination system to generate desalinated water from saline water or other solvents using magnetic fields and electric fields. The lack of fresh water in many areas of the world contributes to poor health, poor hygiene, poor nutrition, and is a barrier against improvements to standards of living. The disclosed liquid desalination system provides an economical, fast, and relatively low power technique for generating desalinated water from saline water or other solvents. The liquid desalination system receives saline water (or another solvent) in a feed line. The liquid desalination system applies an oscillating magnetic field to the saline water with a polarity that is opposite to the direction of flow of the saline water in the feed line, according to an embodiment. The oscillating magnetic field may weaken bonds between negatively charged ions (e.g., chloride) and water molecules and may weaken bonds between positively charged ions (e.g., sodium) and water molecules, according to an embodiment. The liquid desalination system may apply an electric field to the saline water downstream of application of the magnetic field, according to an embodiment. The electric field is applied between a positive electrode and a negative electrode, according to an embodiment. The electric field is applied perpendicular to the direction of flow of saline water, according to an embodiment. The positive electrode attracts and retains the negatively charged ions (e.g., chloride) from the saline water and the negative electrode attracts and retains the positively charged ions (e.g., sodium) from the saline water, according to an embodiment. After passing through the oscillating magnetic field and the electric field, the saline water (or other solvent) becomes desalinated, according to an embodiment. Advantageously, the disclosed liquid desalination system removes charged contaminates (e.g., sodium and chloride) without the passing saline water through a membrane and without use of chemical additives.

Figure 1:
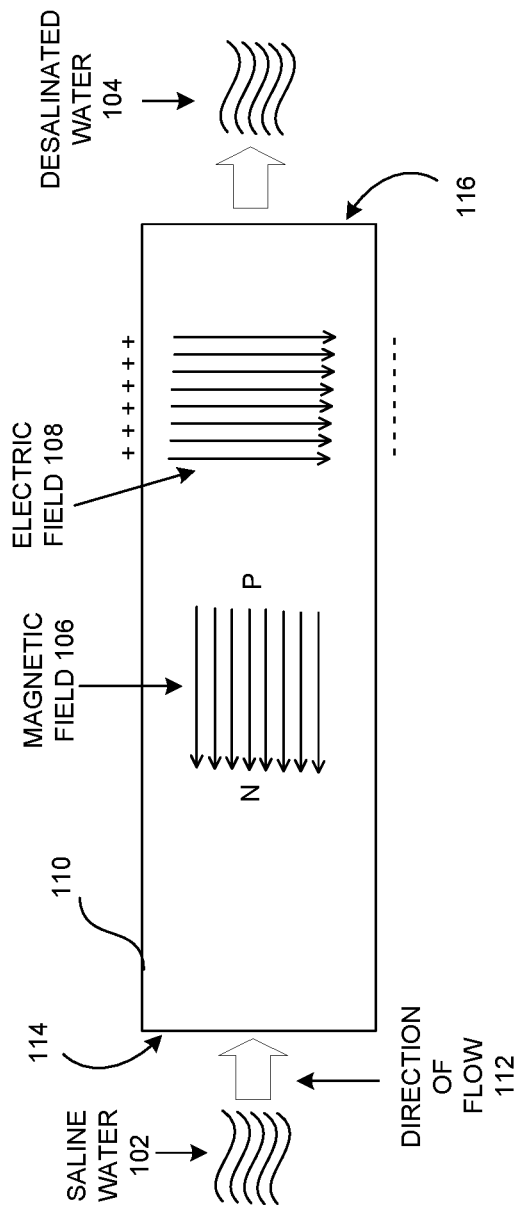
FIG. 1 shows an example of a liquid desalination system, in accordance with embodiments of the present disclosure.

FIG. 1 illustrates an example diagram of a liquid desalination system 100, in accordance with embodiments of the present disclosure. The liquid desalination system 100 receives saline water 102 and discharges desalinated water 104, by applying an oscillating magnetic field 106 and an electric field 108 to the saline water 102, according to an embodiment. As used herein, the term "saline water" is generally intended to include other solvents in addition to saline water.

The liquid desalination system 100 includes a feed line 110 that receives the saline water 102 and that discharges the desalinated water 104, according to an embodiment. The feed line 110 that receives the saline water 102 with a direction of flow 112, according to an embodiment. The feed line 110 may be made of antiferromagnetic materials (e.g., hematite, metals such as chromium, alloys such as iron manganese (FeMn), and oxides such as nickel oxide (NiO)), according to an embodiment. The saline water 102 maintains the direction of flow 112 through the feed line 110, as the saline water 102 is desalinated, according to an embodiment.

The liquid desalination system 100 applies the oscillating magnetic field 106 and the electric field 108 to the saline water 102, as the saline water 102 passes from an inlet 114 to an outlet 116 of the feed line 110, according to one embodiment. The liquid desalination system 100 generates and applies the oscillating magnetic field 106 to the saline water 102 in a direction that is opposite with the direction of flow 112, according to an embodiment. The polarity of the oscillating magnetic field 106 is positive to negative in a direction that is opposite to the direction of flow 112, according to an embodiment. That is, the oscillating magnetic field 106 within the feed line 110 has a polarity that opposes the direction of flow 112, according to an embodiment. The oscillating magnetic field 106 is opposite to the direction of flow 112 and is opposite or parallel to a body (e.g., inner walls and/or outer walls) of the feed line 110, according to an embodiment. In one embodiment, the magnetic field 106 is static and not oscillating. In an embodiment, the oscillating magnetic field 106 within the feed line 110 has a polarity that is parallel to (not opposing) the direction of flow 112.

The liquid desalination system 100 generates and applies the electric field 108 to the saline water 102 in a direction that is perpendicular to the direction of flow 112, according to an embodiment. The polarity of the electric field 108 is positive to negative across the feed line 110, according to an embodiment. The liquid desalination system 100 applies the electric field 108 to the saline water 102 downstream of where the oscillating magnetic field 106 is applied to the saline water 102, according to an embodiment.

The liquid desalination system 100 performs a number of operations to generate the desalinated water 104 from the saline water 102, according to an embodiment. In operation, the saline water 102 enters the feed line 110 at the inlet 114. The liquid desalination system 100 applies the oscillating magnetic field 106 to the saline water 102 to weaken bonds between sodium ions and water molecules and to weaken bonds between chloride ions and water molecules, according to an embodiment. After the applying the magnetic field 106 to the saline water 102, the liquid desalination system 100 applies an electric field 108 to the saline water 102, to attract the sodium ions and the chloride ions away from the water molecules, according to an embodiment. The negatively charged chloride ions are attracted to a positively charged electrode (an anode), and the positively charged sodium ions are attracted to a negatively charged electrode (a cathode), to displace the sodium ions and the chloride ions from the saline water 102, according to an embodiment. By passing the saline water 102 through the oscillating magnetic field 106 and through the electric field 108, the saline water 102 is converted into the desalinated water 104, according to an embodiment.

Figure 2:
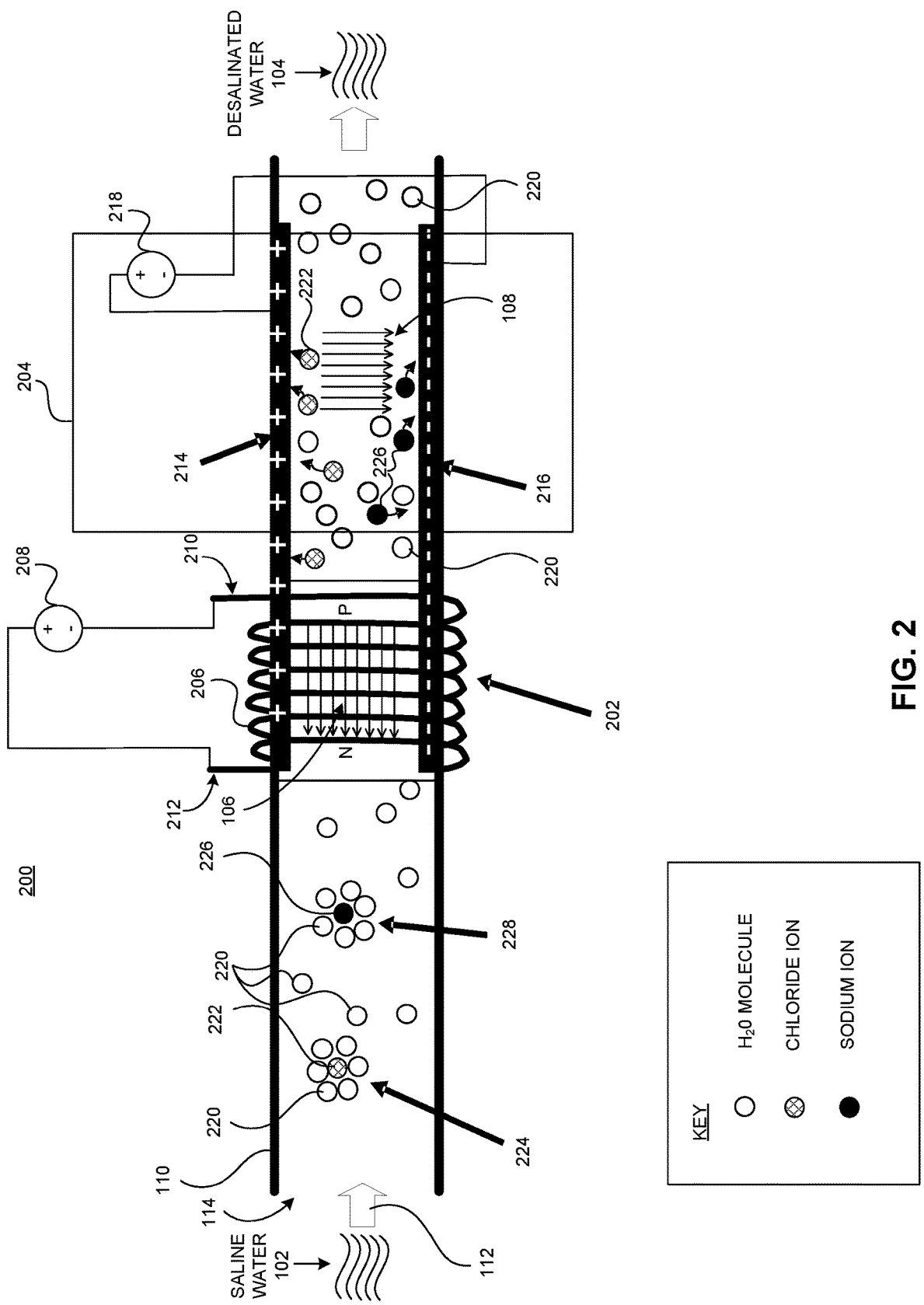
FIG. 2 shows an example of a liquid desalination system, in accordance with embodiments of the present disclosure.

FIG. 2 illustrates an example diagram of a liquid desalination system 200, in accordance with embodiments of the present disclosure. The liquid desalination system 200 is an example implementation of the liquid desalination system 100 (shown in FIG. 1). The liquid desalination system 200 includes an electromagnetic coil 202 to generate the oscillating magnetic field 106, and includes an electric field generator 204 to generate the electric field 108, according to an embodiment.

The electromagnetic coil 202 is configured to generate the oscillating magnetic field 106 within the feed line 110 and in a direction that is opposite the direction of flow 112, according to an embodiment. The electromagnetic coil 202 includes a conductor 206 (e.g., metal wire) that is wrapped or looped around the feed line 110. To function as the electromagnetic coil 202, the conductor 206 is looped counterclockwise around the feed line 110 in a direction that is opposite to the direction of flow 112 towards the inlet 114, according to an embodiment. To generate the oscillating magnetic field 106, a power supply 208 may apply a positive voltage to a first end 210 of the conductor 206 and may apply a negative or a reference voltage to a second end 212 of the conductor 206. In one embodiment, the oscillating magnetic field 106 is in the range of 20-30 milliTesla (mT), with electromagnetic waves that sweep all the frequency ranges from 1,500-15,000 Hz at a rate of 10-20 times a second. The removal of a targeted ion can be achieved by contorting/manipulating the frequency and rate of the generated electromagnetic waves. The generated electromagnetic waves can be tuned to weaken the hydration bonds of a specific ion and facilitate its removal. In an embodiment, the electromagnetic coil 202 is a shell electromagnet (e.g., positioned around an exterior of the feedline 110). In an embodiment, the electromagnetic coil 202 or another magnet (e.g., a permanent magnet) is installed within the walls of the feed line 110.

The electric field generator 204 includes a positive electrode 214, a negative electrode 216, and a power supply 218, according to an embodiment. The positive electrode 214 and the negative electrode 216 are positioned within the feed line 110 on opposing sides, to generate the electric field 108 across a channel encompassed by the feed line 110, according to an embodiment. The positive electrode 214 and the negative electrode 216 may be positioned internal to the feed line 110, according to an embodiment. The positive electrode 214 and the negative electrode 216 may be positioned external to the feed line 110, according to an embodiment. The positive electrode 214 and the negative electrode 216 may be partially positioned internal to the feed line 110 and partially positioned external to the feed line 110, according to an embodiment. The positive electrode 214 and the negative electrode 216 may be porous and may be at least partially constructed of carbon, to facilitate ion adsorption from the saline water 102, according to an embodiment. The positive electrode 214 and the negative electrode 216 may be aluminum or some other metal that is not ferromagnetic. The positive electrode 214 and the negative electrode 216 may include channels that enable the negatively charged chloride ions and the positively charged sodium ions to be removed or discharge from the feed line 110, according to an embodiment. The positive electrode 214 and the negative electrode 216 may be positioned within the feed line 110 to at least partially overlap with the electromagnetic coil 202, such that the electric field 108 is at least partially generated within the magnetic field 106, according to an embodiment. The power supply 218 may apply 1.2 volts across the positive electrode 214 and the negative electrode 216, to generate the electric field 108, according to an embodiment. The power supply 218 may apply higher or lower voltage levels across the positive electrode 214 and the negative electrode 216, to generate electric field 108, according to various embodiments.

The liquid desalination system 200 illustrates ion removal from the saline water 102, to generate the desalinated water 104, according to an embodiment. The saline water 102 includes water molecules 220, chloride ions 222, and chloride-water clusters 224 that comprise water molecules 220 bonded to chloride ions 222, according to an embodiment. The saline water 102 includes sodium ions 226 and sodium-water clusters 228 that comprise water molecules 220 bonded to the sodium ions 226, according to an embodiment.

The water molecules 220, the chloride-water clusters 224, and the sodium-water clusters 228 flow through the magnetic field 106 that is generated by the electromagnetic coil 202, according to an embodiment. When passed through the magnetic field 106, the bonds of the chloride-water clusters 224 and the bonds of the sodium-water clusters 228 are weakened, which facilitates removal of the chloride ions 222 from the chloride-water clusters 224 and facilitates removal of the sodium ions 226 from the sodium-water clusters 228, according to an embodiment. In other words, the magnetic forces from the magnetic field 106 increase the mobility of ions and/or charged dissolved particles, which are subsequently removed with the electric potential of the electric field 108. Electro-sorption or electrosorption of ions and/or charged dissolved particles may be achieved when exposed to magnetic and electrical forces.

The water molecules 220, the chloride-water clusters 224, and the sodium-water clusters 228 flow from the magnetic field 106 through the electric field 108, where the chloride ions 222 and the sodium ions 226 are removed from the water molecules 220, according to an embodiment. In the presence of the electric field 108, the negatively charged chloride ions 222 are attracted to the positive electrode 214, and the positively charged sodium ions 226 are attracted to the negative electrode 216, resulting in desalination of the water molecules 220.

FIG. 3A illustrates an example diagram of a liquid desalination system 300, in accordance with embodiments of the present disclosure. The liquid desalination system 300 is an implementation of the liquid desalination system 100 and/or the liquid desalination system 200, according to an embodiment. The liquid desalination system 300 includes a configuration of a positive electrode 302 and a negative electrode 304 that may be used to generate desalinated water 104 from saline water 102. The positive electrode 302 and the negative electrode 304 are porous to effectively increase the surface area of the electrodes, according to one embodiment. The positive electrode 302 and the negative electrode 304 are porous to facilitate removal of chloride ions and sodium ions from the saline water 102, according to an embodiment. The positive electrode 302 and the negative electrode 304 are at least partially constructed from carbon, according to an embodiment. The positive electrode 302 and a negative electrode 304 may be fully positioned internal to the feed line 110, or may be partially positioned internal to the feed line 110 and external to the feed line 110, according to various implementations of the disclosed technologies.

FIG. 3B illustrates an example diagram of a liquid desalination system 320, in which the negative electrode 304 (i.e., the cathode) is in middle or centered within the feed line 110, in accordance with embodiments of the present disclosure. In an embodiment, the positive electrode 302 is internal to a perimeter of the shell or body of the feedline 110, and the negative electrode is positioned proximate to the shell or body of the feedline 110.

FIG. 4 illustrates an example flow diagram of method 400 of desalinating a liquid, in accordance with embodiments of the present disclosure.

At operation 402, the method 400 includes directing liquid through an inlet of a feed line to cause the liquid to pass through the feed line and to exit an outlet of the feed line, according to an embodiment.

At operation 404, the method 400 includes generating a magnetic field within at least part of the feedline, wherein the magnetic field is opposite (e.g., parallel and opposite) to a direction of flow of the liquid, according to an embodiment.

At operation 406, the method 400 includes generating an electric field across the feedline, wherein the electric field is perpendicular to the direction of flow of the liquid, according to an embodiment.

Figure 5:
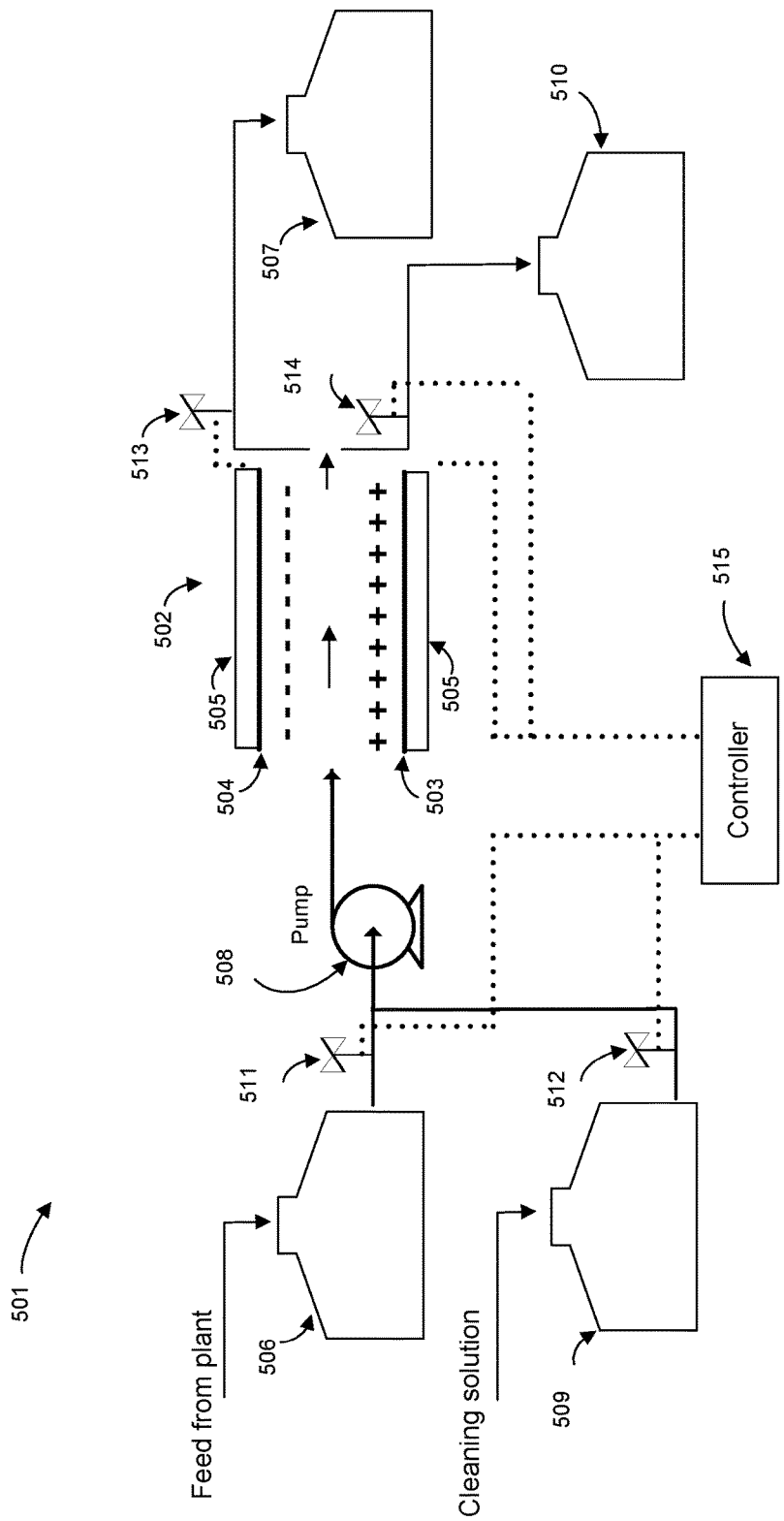
FIG. 5 shows an example of a desalination plant, in accordance with embodiments of the present disclosure.

FIG. 5 illustrates a diagram of a desalination plant 500 to provide continuous removal of ions and/or charged particles from saline water and other solvents, according to an embodiment. The desalination plant 500 includes a dissolved particles removal process 501, according to an embodiment.

The continuous ions and/or charged dissolved particles removal process 501 has a main separation cell 502 that may include a positively charged electrode 503, a negatively charged electrode 504, and shell electromagnet 505 aligned along or in a part of the separation cell 502 or in a feed line immediately before or upstream of the separation cell. The separation cell 502 is an implementation of one or more of the liquid desalination systems 100, 200, 300, or 320, according to an embodiment. The generated electromagnetic waves can be opposite to the direction of the flow of the liquid (indicated with arrows) through the separation cell 502.

The continuous ions and/or charged dissolved particles removal process 501 includes a solvent, i.e. saline water tank 506, a clean solvent, i.e., water tank 507, a feed pump 508, a cleaning solution tank 509 for electrodes reactivation, waste tank 510, a feed tank control valve 511, a cleaning stream control valve 512, a control valve 513 in the product stream and a waste stream control valve 514 on the waste stream and centralized control unit 515.

The saline tank 506 has a feed inlet, e.g., a saline water stream in the desalination plant 500. The saline water or solution is pumped by feed pump 508 to a separation cell 502 that includes a positively charged electrode 503, a negatively charged electrode 504, and shell-electromagnet 505 aligned along or in a part of the separation cell 502 or in the feed line immediately before (or upstream of) the separation cell. Ions and/or charged dissolved particles may be electrically adsorbed in the electrodes. Clean water may be collected in (product) water tank 507.

The regeneration cycle includes closing the feed tank control valve 511 and control valve 513, and opening the cleaning stream control valve 512 and waste stream control valve 514 with the centralized control unit 515. The centralized control unit 515 may switch the polarity of the electrodes and pump cleaning solution through the feed pump 508. The waste stream may be collected in tank 510. Two or more units may be installed to facilitate continuous operation; while one is in operation the other may be under regeneration.

Figure 6A:
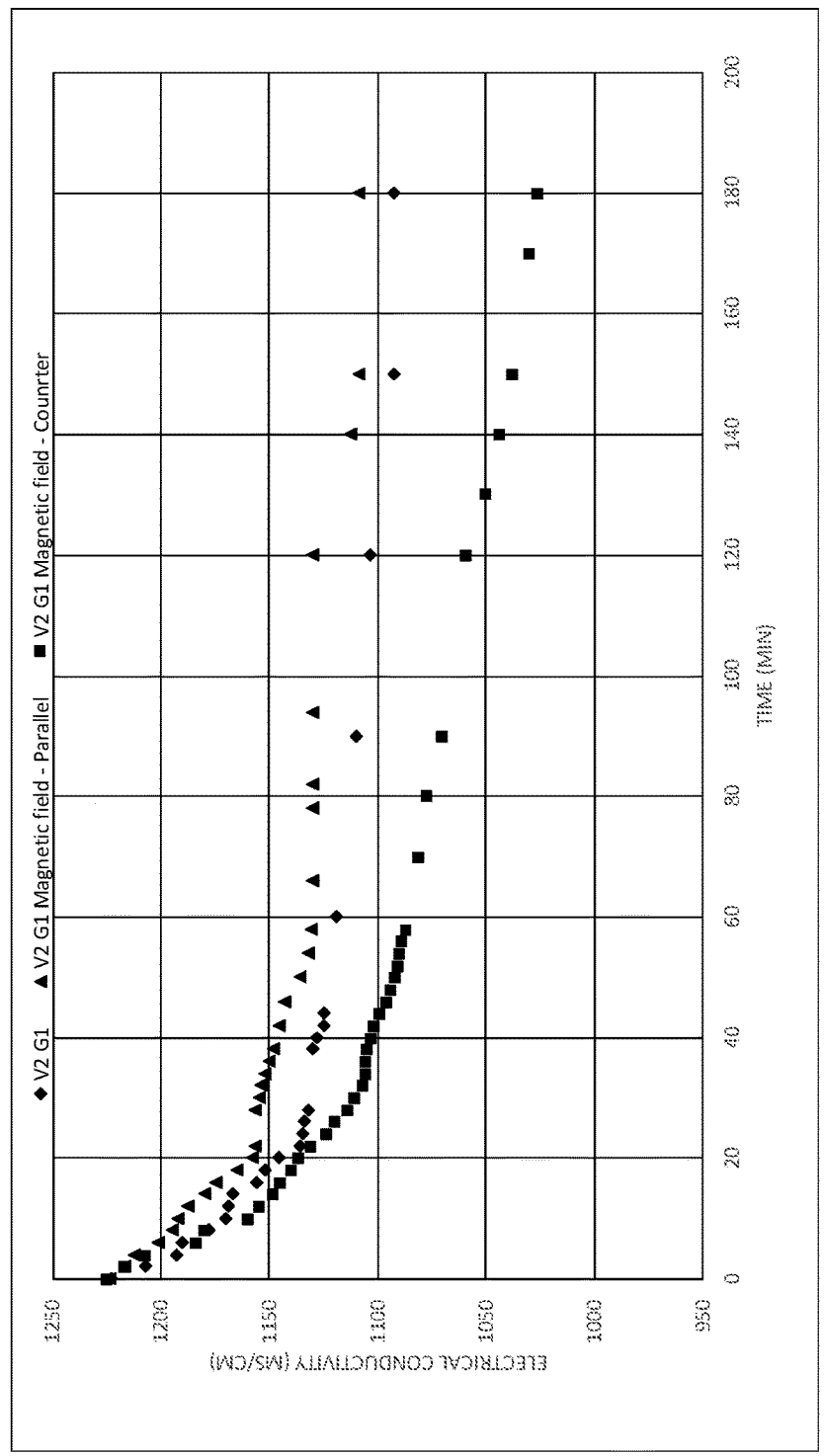
FIGS. 6A and 6B show example experimental data of electrosorption by embodiments of a liquid desalination system, in accordance with embodiments of the present disclosure.
Figure 6B:
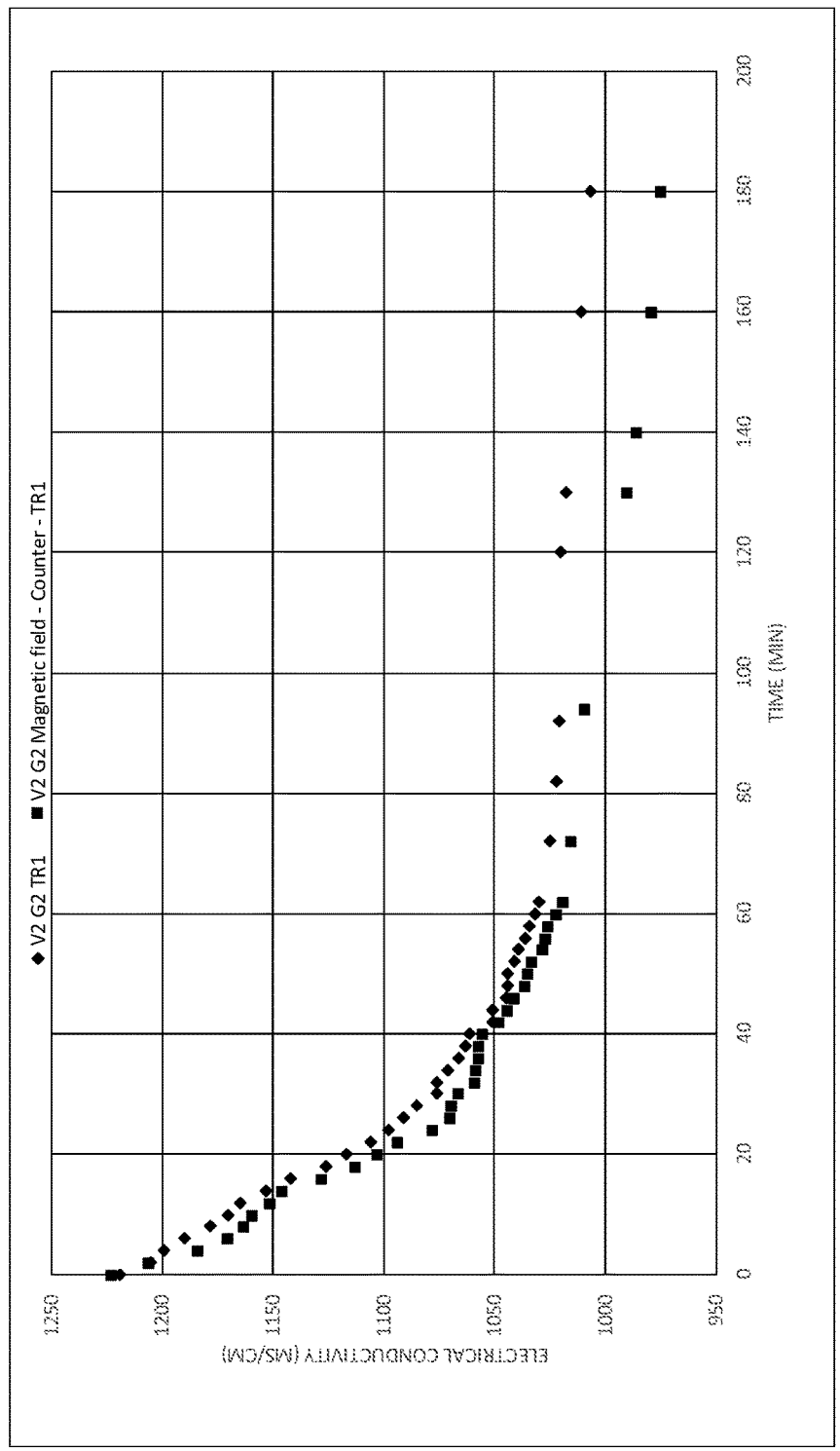

FIGS. 6A and 6B illustrate charts of experimental data of electrosorption improvement by applying a magnetic field to saline water opposite the direction of flow of the saline water in a feedline. The experimental data is provided for illustration purpose of the potential benefits and results of providing a magnetic field to saline water to facilitate de-ionization of the saline water.

FIG. 6A illustrates a chart 600 that shows that the magnetic field of 25 mT ($10^{-3}$ Tesla) applied in the counter direction with respect to the feed flow enhanced the adsorption capacity of a typical capacitive deionization unit by 47% compared with the same operating conditions without magnetic field. In the chart 600, the data points for "V2 G1" represent no magnetic field applied. The data points for "V2 G1 Magnetic Field—Parallel" represent a magnetic field applied in the same direction as the flow of water. The data points for "V2 G1 Magnetic Field—Counter" represent a magnetic field applied in the opposite direction as the flow of water.

The electrical conductivity of the Y-axis correlates with particulate ion concentration in the water. The more ions that exist in the water, the higher the electrical conductivity is for the water. The initial electrical conductivity of the saline water for the three tests is approximately 1225 µS/cm. The ending electrical conductivity of the saline water for V2 G2 (no magnetic field) is approximately 1100 µS/cm, the ending electrical conductivity of the saline water for V2 G1 Magnetic Field—Parallel is approximately 1125 µS/cm, and the ending electrical conductivity of the saline water for V2 G1 Magnetic Field—Counter is approximately 1045 µS/cm. While the V2 G2 test reduced the electrical conductivity by approximately 125 µS/cm (125 µS/cm/1225 µS/cm=10.2%), the V2 G1 Magnetic Field—Counter test reduced the electrical conductivity by approximately 180 µS/cm (180 µS/cm/1225 µS/cm=14.7%), which is an improvement of approximately 47%.

The experiments of chart 600 provide illustrative data for the potential effect of a magnetic field application to saline water or other solvents. The magnetic field affects the hydrogen bonding between the water molecules and dissolved ions and thus affect the mobility of the dissolved ions toward the electrodes. Moreover, hydrogen bonding breakage reduces the size of the ions and enhances the saturation capacity of the electrodes as free ions diffuse deeper inside electrodes pores. However, when the magnetic field is applied in the parallel direction to the water flow reduced the adsorption rate and the electro-sorption capacity.

FIG. 6B illustrates a chart 620 that illustrates that a magnetic field of 25 mT (10-3 Tesla) applied in the counter direction with respect to the feed flow enhanced the adsorption capacity of a typical capacitive deionization unit by approximately 17%. The data for the chart 620 utilizes a different electrode material than the electrode material used in the experiment represented by chart 600. The data points for "V2 G2 TR1" represent a typical capacitive deionization unit with no magnetic field applied. The data points for "V2 G2 Magnetic Field—Counter" represent a magnetic field applied in the opposite direction of the flow of water. The initial electrical conductivity of the saline water for both tests is approximately 1225 µS/cm. The ending electrical conductivity of the saline water for V2 G2 TR1 is approximately 1010 µS/cm, and the ending electrical conductivity of the saline water for V2 G2 Magnetic Field—Counter is approximately 970 µS/cm.

The enhancement of the electrode capacity and overall salt removal due to applying a magnetic field is assured by repeating the experiments of FIGS. 6A and 6B, however, this enhancement may be affected by the electrode material and pores structures, according to various embodiments of the disclosure.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A liquid desalination system, comprising:
   a feed line having an inlet to receive liquid and an outlet to discharge the liquid;
   a magnet coupled to the feed line, the magnet to generate a magnetic field within the feed line and in parallel to the feed line; and
   an electric field generator coupled to the feed line to generate an electric field across the feed line and to enable the liquid to flow through the electric field, the electric field generator being positioned downstream of the magnet.

2. The liquid desalination system of claim 1, wherein the magnetic field is an oscillating magnetic field.

3. The liquid desalination system of claim 1, wherein a polarity of the magnetic field is opposite to a direction of flow of the liquid.

4. The liquid desalination system of claim 1, wherein the feed line includes an external surface, wherein the magnet is coupled to the external surface of the feed line.

5. The liquid desalination system of claim 1, wherein the magnet is an electromagnet.

6. The liquid desalination system of claim 1, wherein the electric field generator includes a first electrode and a second electrode.

7. The liquid desalination system of claim 1, wherein the feedline is an antiferromagnetic material.

8. The liquid desalination system of claim 6, wherein the first electrode and the second electrode are at least partially positioned within an interior surface of the feed line.

9. The liquid desalination system of claim 6, wherein a voltage potential from the first electrode to the second electrode is at least 1.2 volts.

10. The liquid desalination system of claim 6, wherein the first and second electrodes are porous.

11. The liquid desalination system of claim 6, wherein the first and second electrodes are at least partially constructed of carbon.

12. A method of desalinating liquid, comprising:
    directing liquid through an inlet of a feed line to cause the liquid to pass through the feed line and to exit an outlet of the feed line;
    generating a magnetic field within at least part of the feed line, wherein the magnetic field is parallel to a direction of flow of the liquid; and
    generating an electric field across the feed line downstream of the magnetic field, wherein the electric field is perpendicular to the direction of flow of the liquid.

13. The method of claim 12, wherein generating the magnetic field includes generating the magnetic field with an electromagnet exposed externally to the feed line.

14. The method of claim 12, wherein a polarity of the magnetic field is positive to negative in opposition to the direction of the flow of the liquid.

15. The method of claim 12, wherein the magnetic field includes magnetic field waves and is an oscillating magnetic field.

16. The method of claim 12, wherein generating the electric field includes generating the electric field with a first electrode and a second electrode disposed on opposite sides of the feed line, wherein the method further comprises positioning the first electrode and the second electrode at least partially within the feed line.

17. A computer-readable storage device having stored thereon instructions that when executed by one or more processors result in operations comprising: the method according to claim 12.

18. A device comprising means to perform the method of claim 12.

* * * * *